United States Patent
Nakazawa et al.

(10) Patent No.: US 9,241,503 B2
(45) Date of Patent: *Jan. 26, 2016

(54) FEED ADDITIVE COMPOSITION FOR RUMINANTS AND METHOD OF PRODUCING THE SAME

(71) Applicant: AJINOMOTO CO., INC., Tokyo (JP)

(72) Inventors: Hidetsugu Nakazawa, Yokohama (JP); Hiroyuki Sato, Yokohama (JP); Yuki Miyazawa, Yokohama (JP); Susumu Shibahara, Kawasaki (JP); Sachiko Oka, Kawasaki (JP); Yumi Goto, Kawasaki (JP)

(73) Assignee: Ajinomoto Co., Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/316,828

(22) Filed: Jun. 27, 2014

(65) Prior Publication Data
US 2014/0308418 A1    Oct. 16, 2014

Related U.S. Application Data

(60) Division of application No. 13/709,194, filed on Dec. 10, 2012, which is a continuation of application No. 12/409,132, filed on Mar. 23, 2009, now abandoned, which is a continuation-in-part of application No. PCT/JP2007/001088, filed on Oct. 4, 2007.

(30) Foreign Application Priority Data

Oct. 4, 2006  (JP) .................................. 2006-273330
Dec. 28, 2006  (JP) .................................. 2006-354771

(51) Int. Cl.
 A23K 1/18 (2006.01)
 A23K 3/00 (2006.01)
 (Continued)

(52) U.S. Cl.
 CPC ............... *A23K 1/1813* (2013.01); *A23K 1/005* (2013.01); *A23K 1/164* (2013.01); *A23K 1/1634* (2013.01)

(58) Field of Classification Search
CPC ..... A23K 1/1813; A23K 1/005; A23K 1/164; A23K 1/1634

USPC ............................................ 426/2, 53, 54, 74
See application file for complete search history.

(56) References Cited

U.S. PATENT DOCUMENTS 3,804,776 A * 4/1974 Yazawa et al. ............. 427/213.3
4,713,245 A * 12/1987 Ando et al. .................... 424/438
(Continued)

FOREIGN PATENT DOCUMENTS

EP  0 495 441 A2  7/1992
EP  0 495 441 A3  7/1992
(Continued)

OTHER PUBLICATIONS

Chockshi et al., "Hot-Melt Extrusino Technique—A Review" Iranian Jounal of Phamaceutical Research (2004) 3: 3-16.*
(Continued)

*Primary Examiner* — Rena L Dye
*Assistant Examiner* — Assaf Zilbering
(74) *Attorney, Agent, or Firm* — Oblon, McClelland, Maier & Neustadt, L.L.P.

(57) ABSTRACT

A food additive composition for ruminants of the dispersion type and a method of continuously producing the same. This food additive composition for ruminants, which contains 40% by weight or more but less than 65% by weight of a basic amino acid and has rumen bypass properties, is formulated into granules in an arbitrary shape which are scarcely classified when added to a silage or another feed. Thus, attempts have been made to develop a method of producing granules by which the milk yield of a lactation cow can be increased. Namely, it is intended to provide a food additive composition for ruminants which contains at least one protecting agent selected from among a hardened vegetable oil and a hardened animal oil having a melting point higher than 50° C. but lower than 90° C., 0.05 to 6% by weight of lecithin, water and 40% by weight or more but less than 65% by weight of a basic amino acid. It is also intended to provide a method of producing a food additive composition for ruminants characterized by comprising solidifying a molten mixture, which comprises at least one protecting agent selected from among a hardened vegetable oil and a hardened animal oil having a melting point higher than 50° C. but lower than 90° C., lecithin and a basic amino acid, by dipping in water.

13 Claims, 1 Drawing Sheet

(51) Int. Cl.
*A23L 1/00* (2006.01)
*A23K 1/00* (2006.01)
*A23K 1/16* (2006.01)

(56) References Cited

U.S. PATENT DOCUMENTS

| | | | |
|---|---|---|---|
| 5,227,166 | A | 7/1993 | Ueda et al. |
| 5,300,297 | A | 4/1994 | Ueda et al. |
| 5,402,992 | A * | 4/1995 | Saxena .................. 266/202 |
| 5,429,832 | A | 7/1995 | Ueda et al. |
| 5,744,178 | A | 4/1998 | Ikeda et al. |
| 5,753,223 | A | 5/1998 | Shibahara et al. |
| 6,238,727 | B1 | 5/2001 | Takemoto et al. |
| 6,797,291 | B2 | 9/2004 | Richardson |
| 2003/0129295 | A1 | 7/2003 | Richardson |
| 2004/0033266 | A1 | 2/2004 | Thassu |
| 2007/0148212 | A1* | 6/2007 | Okutani et al. ............. 424/442 |
| 2009/0092704 | A1 | 4/2009 | Gately et al. |
| 2009/0232933 | A1 | 9/2009 | Nakazawa et al. |
| 2010/0272852 | A1 | 10/2010 | Wright et al. |
| 2011/0081444 | A1 | 4/2011 | Nakazawa et al. |
| 2011/0081445 | A1 | 4/2011 | Nakazawa et al. |
| 2011/0250286 | A1 | 10/2011 | Marcello et al. |
| 2013/0095206 | A1 | 4/2013 | Nakazawa et al. |
| 2014/0065260 | A1 | 3/2014 | Nakazawa et al. |

FOREIGN PATENT DOCUMENTS

| | | |
|---|---|---|
| EP | 0 610 957 | 8/1994 |
| EP | 0 940 088 | 9/1999 |
| EP | 1 405 570 | 4/2004 |
| EP | 1 741 347 | 1/2007 |
| JP | 49-45224 | 12/1974 |
| JP | 61-28351 | 2/1986 |
| JP | S61-28351 | 2/1986 |
| JP | H10-42795 | 2/1988 |
| JP | 5-192096 | 8/1993 |
| JP | H 9-172979 | 7/1997 |
| JP | 10-42795 | 2/1998 |
| JP | 11-243871 | 9/1999 |
| JP | 2000-60440 | 2/2000 |
| JP | 2005-312380 | 11/2005 |
| JP | 2006-141270 | 6/2006 |

OTHER PUBLICATIONS

"ADM Feed Ingredients Catalog". Available online at www.admworld.com on Mar. 2008.*
"Lecithin Emulsifying". Available online at www.adm.com on May 10, 2005.*
Office Action mailed Oct. 24, 2014 in Co-Pending U.S. Appl. No. 12/696,208.
"Lecithin Emulsifying" ADM, www.adm.com/food, May 10, 2005.
Chinese Office Action issued Aug. 17, 2011, in Chinese Patent Application No. 200780037315.1 (2011081300101530).
Chokshi et al., Hot-Melt Extrusion Technique—A Review. Iranian Journal of Pharmaceutical Research (2004) 3:3-16.
Water Activity in Food, www.drine.ucdavis.edu/dairychem4_new.htm (Feb. 1, 2001).
U.S. Appl. No. 14/316,827, filed Jun. 27, 2014, Nakazawa, et al.
U.S. Appl. No. 12/696,208, filed Jan. 29, 2010, Shibahara, et al.

* cited by examiner

FEED ADDITIVE COMPOSITION FOR RUMINANTS AND METHOD OF PRODUCING THE SAME

CROSS REFERENCES TO RELATED APPLICATIONS

This application is a division of U.S. patent application Ser. No. 13/709,194, filed Dec. 10, 2012, which is a continuation of U.S. patent application Ser. No. 12/409,132, filed Mar. 23, 2009, which is a continuation in-part of International patent application no. PCT/JP2007/001088, filed on Oct. 4, 2007, the disclosures of which are incorporated herein by reference in their entireties. This application claims priority to Japanese patent application no. 2006-273330, filed on Oct. 4, 2006, and Japanese patent application no. 2006-354771, filed on Dec. 28, 2006, the disclosures of which are incorporated herein by reference in their entireties.

BACKGROUND OF THE INVENTION

1. Field of the Invention

The present invention relates to feed additive compositions for ruminants, in particular, feed additive compositions for ruminants which are capable of bypassing the rumen in lactating cows. The present invention also relates to methods of producing the same. The present invention further relates to methods of raising ruminants and methods of making products derived from ruminants.

2. Discussion of the Background

When ruminants ingest feed, a portion of the nutrients in the feed is exploited as the nutrient sources for microorganisms living together in the rumen. Therefore, there have been used feed additive preparations for ruminants which are not degradable by the rumen juice, wherein nutrients in the preparations are protected with protective agents so that the nutrients are not exploited by microorganisms when passing through the rumen.

The main nutrients that supplement the feed for ruminants as nutrients are amino acids. The solubility of amino acids varies with the type of amino acid, and according to the Handbook of Amino acids, published by Kogyo Chosakai Publishing Co., Ltd., 2003, the solubilities (g/dl) in water at 0° C., 20° C., 40° C., and 50° C. for L-lysine monohydrochloride, which is one of the basic amino acids, are 53.6, (67.0), 95.5, and 111.5, respectively; for L-methionine are 3.0, 4.8, (6.5), and 7.3, respectively; and for L-isoleucine are 3.8, (4.0), (4.5), and 4.8, respectively (the values inside the parentheses are extrapolated values in the solubility curves). As is clearly shown from these values, although L-methionine has low solubility in water, L-lysine monohydrochloride is easily soluble in water such that the solubility is some ten-fold the solubility of L-methionine, and thus is easily eluted from the preparation to the rumen juice. Therefore, it is an especially important issue to prevent elution of basic amino acids, particularly L-lysine monohydrochloride which is generally used in the form of hydrochloride, to the rumen juice, and exploitation thereof by microorganisms.

As one of the feed additive preparations for ruminants in which nutrients are protected with protective agents, there may be mentioned a dispersion type preparation in which the nutrients and protective agents are kneaded together. However, in the case of dispersion type preparations, amino acids are partially exposed at the preparation surface, and thus when the amino acids are in contact with the rumen juice at pH 6 to 8, the amino acids are prone to be eluted. Therefore, it is difficult to say that prevention of the loss of amino acids in the rumen, particularly basic amino acids, is sufficiently accomplished. Furthermore, formulation is carried out using a variety of protective agents so as to reduce the loss of amino acids from the preparations, and as a result, a problem arises that the contents of amino acids in the preparations become relatively scarce. Thus, in general, it is difficult to produce dispersion type preparations containing amino acids in an amount exceeding 40% by weight. Also, in order to prevent the loss of amino acids in a dispersion type preparation, there have been developed a coated type preparation formed by using the dispersion type preparation as a core, and further coating the core with a coating agent to encapsulate the dispersion type preparation. In this preparation, since there is no chance for the amino acids to be exposed at the preparation surface due to the coating, the amino acids are relatively stable in the rumen juice, but the preparations have a defect in terms of production, such that the production process becomes complicated compared to the production process of dispersed type preparations, and thus more processes are needed.

Japanese Patent Application Publication (JP-B) No. 49-45224 describes the production of dispersion type granules having a size of several millimeters or less, using a mixture of oils and fats having a melting point of 40° C. or higher and oils and fats having a melting point of 40° C. or lower as a protective agent, by dispersing amino acids or peptides in the mixture, and injecting the mixture into water of 20° C. to 40° C. through nozzles having a diameter of 0.8 to several millimeters. Japanese Patent Application Publication (JP-B) No. 49-45224 also describes the production of granules containing 30 to 40% of L-methionine or L-isoleucine as the amino acid, which both have low solubility in water; however, there is no description on the production of granules containing L-lysine monohydrochloride, which has high solubility in water.

Japanese Patent Application Laid-Open (JP-A) No. 2005-312380 describes a method of producing a dispersion type rumen bypassing agent by solidifying a mixture containing hardened oil and lecithin as protective agents, and saturated or unsaturated fatty acid monocarboxylates having 12 to 22 carbon atoms, into spheres having a diameter of 0.5 to 3 mm, by an air prilling method which sprays the mixture into air at a liquefaction temperature of the protective agents, which is from 50 to 90° C. Japanese Patent Application Laid-Open (JP-A) No. 2005-312380 also describes that a rumen bypassing agent containing 40.0% by weight of L-lysine monohydrochloride can be produced by means of the aforementioned production method. However, in the production method described in Japanese Patent Application Laid-Open (JP-A) No. 2005-312380, it is necessary to use a mixture having low viscosity so as to allow the mixture to pass through the spray nozzles, but on the other hand, if the content of L-lysine monohydrochloride in the mixture exceeds 40% by weight, the molten mixture obtains high viscosity, and thus it is difficult to make the mixture to pass through the spray nozzles. Therefore, a preparation containing L-lysine monohydrochloride at a high content which exceeds 40% by weight cannot be obtained with the aforementioned method. In fact, Japanese Patent Application Laid-Open (JP-A) No. 2005-312380 does not describe a preparation containing L-lysine monohydrochloride at a high content which exceeds 40% by weight. Furthermore, although the method described in Japanese Patent Application Laid-Open (JP-A) No. 2005-312380 has a feature wherein small spherical granules having a diameter of 3 mm or less with a relatively well established granularity are obtainable, there is a defect that since the granules are small particles, the granules are likely to escape through dry fodder and be sorted out when mixed into feedstuff.

JP-A No. 2006-141270 describes that L-lysine monohydrochloride was coated with a coating composition including (A) hardened oil, (B) lecithin and (C) an antiseptic, and thus a dispersion type rumen bypassing agent for ruminants containing (C) in an amount of 0.01 to 2.0% by weight was obtained. Furthermore, in Table 1 of JP-A No. 2006-141270, particles containing 37.5% by weight of L-lysine monohydrochloride are described. However, the method described in JP-A No. 2006-141270 utilizes the air prilling method which sprays a mixture into air with an extruder as in the case of the method described in Japanese Patent Application Laid-Open (JP-A) No. 2005-312380, and therefore, an L-lysine monohydrochloride preparation having a content exceeding 40% by weight cannot be obtained, as discussed in regard to the method described in Japanese Patent Application Laid-Open (JP-A) No. 2005-312380. In addition, it is pointed out in Example 1 of JP-A No. 2006-141270 that a rumen bypassing agent solidified into spheres of 0.5 to 2.0 mm in size was obtained; and it is pointed out in paragraph [0005] of the specification, by citing from JP-A No. 2000-60440, "since the particle size is as large as 4 to 15 mm, the particles are susceptible to disintegration by mastication," that is, when the particle size is large, the agent is physically destroyed by cow's mastication, and the rumen bypass effect is decreased; and with regard to the coated type preparation, it is pointed out that " . . . since this rumen bypassing agent is double-coated, there has been a defect that when the coating at the core surface layer part is destroyed by rumination, mastication or the like, the protective effect is extremely reduced, or the like."

Meanwhile, JP-A No. 63-317053 describes a coated type feed additive for ruminants, wherein a core containing a biologically active substance comprised of L-lysine monohydrochloride and other excipients or binders is coated with at least one selected from fatty acid monocarboxylic acids including lecithin and glycerin fatty acid esters, hardened oils, and beeswax/waxes. The content of L-lysine monohydrochloride in the core was 65% by weight, but when the coating layer which occupies 20 to 30% by weight in the final preparation is also included, the content of L-lysine monohydrochloride in the preparation becomes 52 to 39% by weight.

JP-A No. 5-23114 also describes a coated type feed additive composition for ruminants, wherein cylindrical granules produced by extruding a mixture containing a biologically active substance such as L-lysine monohydrochloride through a screen are rendered to be spherically shaped and used as a core, and this core is coated with a composition including one member selected from aliphatic monocarboxylic acids, hardened oils, beeswax and waxes, and lecithin and an inorganic salt which is stable under neutral conditions and soluble in acidic conditions. JP-A No. 5-23114 also describes a preparation containing L-lysine monohydrochloride in the core in an amount of 50% by weight.

The above-described coated type preparations are indeed advantageous in view of containing large amounts of biologically active ingredients, however, since their production includes first making a core containing a biologically active ingredient, and further coating this core with a coating agent, the production is achieved not in a continuous mode but in a batch mode, therefore, an increase in the number of production processes is unavoidable. Furthermore, in the invention described in JP-A No. 5-23114, when the biologically active substance is exposed at the surface by the grinding or damage due to mastication of lactating cows, the resistance to degradation in rumen juice is lowered, and in order to avoid such lowering, the particle size is controlled to be several mm or less, or to 3 mm or less. However, there may be posed a problem such that a preparation having such a dimension is sorted out when mixed into the feedstuff.

Thus, there remains a need for feed additive compositions for ruminants which are capable of bypassing the rumen in lactating cows. The present invention also relates to methods of producing the same.

SUMMARY OF THE INVENTION

Accordingly, it is one object of the present invention to provide novel feed additive compositions for ruminants.

It is another object of the present invention to provide novel feed additive compositions for ruminants which are capable of bypassing the rumen.

It is another object of the present invention to provide novel feed additive compositions for ruminants which are capable of bypassing the rumen in lactating cows.

It is another object of the present invention to provide novel methods of preparing such a feed additive composition.

It is another object of the present invention to provide novel methods for raising ruminants by feeding such a feed additive composition to the ruminants.

It is another object of the present invention to provide novel methods for making a product of a ruminants by feeding such a feed additive compositions to the ruminants and harvesting a product from the ruminants.

In particular, it is another object of the present invention to develop a dispersion type feed additive composition for ruminants containing a basic amino acid which is a biologically active substance in an amount of 40% by weight or more and less than 65% by weight, and a method of producing the same, and more particularly, to develop granules which have rumen bypass properties, can accelerate the milk yield and production of lactating cows by releasing the biologically active substance into the small intestine of the ruminants at high concentrations, and can be made to have an arbitrary shape which is difficult to be sorted out even when added to feedstuff; and a production method of efficiently and continuously producing the granules.

These and other objects, which will become apparent during the following detailed description, have been achieved by the inventors' discovery that water in a feed additive composition for ruminants contributes to the stability of the composition in a high temperature environment, and that in order to make granules to be arbitrarily shaped and to enhance the productivity, when a feed composition containing a biologically active substance is heated to melt while being extruded by a screw in a cylinder of an extrusion granulator (extruder), and the discharged molten mixture is allowed to fall into water from a certain height, granules of a solidified mixture may be obtained.

Thus the present invention provides:

(1) A feed additive composition for ruminants, including at least one protective agent selected from a hardened vegetable oil and a hardened animal oil having a melting point higher than 50° C. and lower than 90° C., 0.05 to 6% by weight of lecithin, 40% by weight or more and less than 65% by weight of a basic amino acid, and water.

(2) The feed additive composition for ruminants according to (1), wherein the content of water is 0.01 to 6% by weight.

(3) The feed additive composition for ruminants according to (1), wherein the content of water is 2 to 6% by weight.

(4) The feed additive composition for ruminants according to any one of (1) to (3), wherein the basic amino acid is L-lysine, L-arginine, L-ornithine, or salts thereof.

(5) The feed additive composition for ruminants according to any one of (1) to (4), wherein the difference in redness (Δt) is 3 to 6 when granules are immersed in a 75% aqueous solution of ethanol containing 0.1% of food colorant No. 102, at 40° C. for 45 minutes.

(6) The feed additive composition for ruminants according to any one of (1) to (5), wherein the average particle size of the basic amino acid is 100 μm or less.

(7) A method of producing a feed additive composition for ruminants, comprising a process of preparing a molten mixture formed from at least one protective agent selected from a hardened vegetable oil and a hardened animal oil having a melting point higher than 50° C. and lower than 90° C., lecithin and a basic amino acid; and a process of obtaining a solidified mixture by immersing the molten mixture into water.

(8) The method of producing a feed additive composition for ruminants according to (7), wherein the process of preparing a molten mixture includes preparing a molten mixture through heating and melting using an extruder, and the process of obtaining a solidified mixture includes obtaining a solidified mixture by allowing the molten mixture to be retained in a multi-hole shooter having a plurality of holes at the vessel bottom, to fall through the plurality of holes to be immersed into water.

(9) The method of producing a feed additive composition for ruminants according to (8), wherein the fall distance from the multi-hole shooter is 5 cm or more and less than 150 cm.

(10) The method of producing a feed additive composition for ruminants according to any one of (7) to (9), wherein the basic amino acid is L-lysine, L-arginine, L-ornithine, or salts thereof.

(11) The method of producing a feed additive composition for ruminants according to any one of (7) to (10), wherein the average particle size of the basic amino acid is 100 μm or less.

(12) The method of producing a feed additive composition for ruminants according to any one of (7) to (11), further including heat treating the solidified mixture.

(13) A process for raising a ruminant, comprising:
feeding a ruminant a feed additive composition for ruminants according to (1).

(14) A process for making meat, comprising:
feeding a ruminant a feed additive composition for ruminants according to (1); and
harvesting meat from said ruminant.

(15) A process for making milk, comprising:
feeding a ruminant a feed additive composition for ruminants according to (1); and
harvesting milk from said ruminant.

(16) A process for making a dairy product, comprising:
feeding a ruminant a feed additive composition for ruminants according to (1);
harvesting milk from said ruminant; and
converting said milk into said dairy product.

(17) A process for making wool, comprising:
feeding a ruminant a feed additive composition for ruminants according to (1); and
harvesting wool from said ruminant.

(18) A process for making leather, comprising:
feeding a ruminant a feed additive composition for ruminants according to (1);
harvesting skin from said ruminant; and
converting said skin into said leather.

The feed additive composition for ruminants of the present invention has a resistance to degradation in rumen juice and dissolubility in the small intestine, and can carry high contents of basic amino acids efficiently and in large quantities to the small intestine of lactating cows. Therefore, the lactating cows can absorb large quantities of amino acids as nutrients, and enhancement of the milk yield and production is made possible. Furthermore, the method of producing a feed additive composition for ruminants involves, for example, retaining a molten mixture produced with an extruder temporarily in a multi-hole shooter, and allowing this mixture to fall through a plurality of holes provided at the bottom of the multi-hole shooter, and thus it is possible to enhance the amount of production of the feed additive composition in accordance with the capacity of the extruder. Furthermore, by controlling the fall distance from the multi-hole shooter, the shape of the granules of the composition produced can be made into various shapes such as a spherical shape, a granular shape, a pellet shape or a shape of pressed barley, due to the energy of impacting the water surface. In particular, the granules of the pellet shape and the shape of pressed barley had a feature of not being easily sorted out when added to feedstuff. The feed additive composition for ruminants of the present invention includes granules having a shape which is easily ground by the mastication of lactating cows, but the feed additive composition is stable in the rumen juice, irrespective of the shape. Also, since the feed additive composition has a high content of basic amino acids which are biologically active substances, it is possible to obtain high quality granules which are capable of releasing more basic amino acids, which are biologically active substances, from the granules in the small intestine of lactating cows. As is obvious from the degree of coloration based on the coloration test using a water-soluble colorant solution shown in the Examples, the composition of the present invention has a surface layer part which has certain water repellency, and therefore, even in the case where the composition is exposed to the rumen juice, elution of the basic amino acids from the composition is effectively prevented, and a high resistance to degradation in rumen juice can be maintained. Particularly, by implementing a heating treatment on the mixture according to the present invention which has been solidified by immersing a molten mixture into water, the water repellent power of the surface layer part of the composition can be increased, and a feed additive composition for ruminants having a resistance to degradation in rumen juice can be attained. Moreover, in the present invention, the difficulty of nutrients to be eluted from a feed composition when the feed composition containing the nutrients is exposed to the rumen juice of a ruminant is referred to as a resistance to degradation in rumen juice, and this is indicated as a proportion (protection ratio %) of basic amino acids in a feed composition, which are not eluted after the composition has been placed in an artificial rumen juice under predetermined conditions. Furthermore, the property of nutrients contained in a feed composition that reach the intestines without being eluted to the stomach of a ruminant is referred to as rumen bypass property, and this is indicated as the product of the content (% by weight) of the basic amino acids in the feed composition and the protection rate (small intestine arrival rate %) mentioned previously. Both the resistance to degradation in rumen juice and the rumen bypass property are used to represent the characteristics of a feed composition which is capable of efficiently supplying basic amino acids to ruminants.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Figure 1:
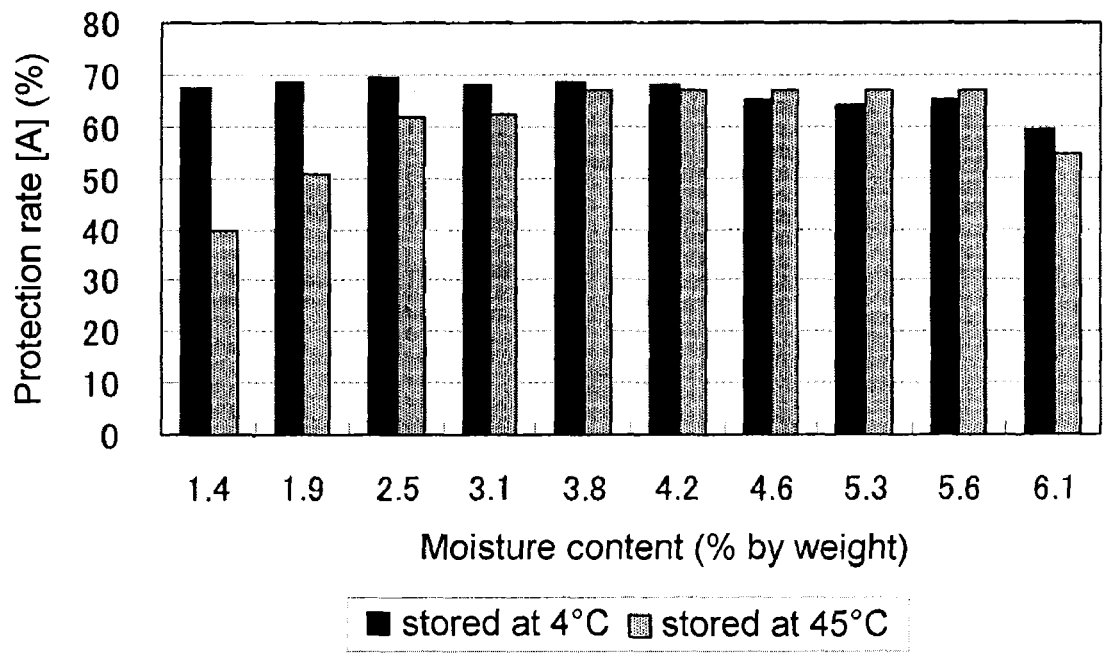
FIG. 1 is a graph showing the relationship between the moisture content (% by weight) and the protection rate [A] (%)

The feed additive composition for ruminants of the present invention contains at least one protective agent selected from a hardened vegetable oil and a hardened animal oil having a melting point higher than 50° C. and lower than 90° C., 0.05 to 6% by weight of lecithin, water, and 40% by weight or more and less than 65% by weight of a basic amino acid.

The basic amino acid used in the present invention includes free basic amino acids as well as physiologically acceptable salts thereof, for example, hydrochlorides or lactates. Suitable examples of the basic amino acid include L-lysine, L-arginine, L-ornithine, and salts thereof. Among them, a basic amino acid which is considered to be the most important in the enhancement of milk yield in lactating cows is L-lysine, and typically, the crystals of L-lysine monohydrochloride are used, which also constitute the most preferred example in the present invention. As for the basic amino acid, commercially available products may be used as it is or after being pulverized, to be mixed with other raw materials. It is preferable for the pulverized crystals of the basic amino acid to have an average particle size of 100 μm or less, and more preferably 50 to 75 μm. Here, the average particle size as used herein means a median diameter. The heating and melting temperature of hardened oil in the extruder is 100° C. or lower, and because L-lysine monohydrochloride having a melting point of 263° C. does not melt, the feed additive composition in the extruder is in fact in a slurry state even though referred to be in a molten state. The content of the basic amino acid is, in terms of L-lysine monohydrochloride, 40% by weight or more and less than 65% by weight, and more preferably 40% by weight or more and 60% by weight or less (32 to 52% by weight in terms of free L-lysine). The feed additive composition for ruminants of the present invention may also contain, in addition to the basic amino acids, methionine, threonine, tryptophan and other amino acids which may be added to the feed for ruminants, and in particular, incorporation of methionine is preferable.

As for the at least one protective agent selected from a hardened vegetable oil and a hardened animal oil having a melting point higher than 50° C. and lower than 90° C., hardened vegetable oils such as hardened soybean oil, hardened rapeseed oil, hardened groundnut oil, hardened olive oil, hardened cottonseed oil, and hardened palm oil, are preferably used. In addition to these, it is also possible to use beeswax, waxes and the like. The content of these substances in the feed additive composition is more than 23% by weight and less than 60% by weight.

The content of lecithin in the feed additive composition for ruminants of the present invention is 0.05 to 6% by weight, preferably 0.05 to 5% by weight, more preferably 0.5 to 3% by weight, and particularly preferably 1 to 2% by weight. Since L-lysine monohydrochloride has a melting point of 263° C., the substance does not melt at 50 to 90° C., which is the melting temperature of the protective agent according to the present invention, and exists as hydrophilic particles in the state of being mixed with the protective agent. Since the hardened oils, beeswax and waxes as the protective agent are oleophilic, the surface of L-lysine monohydrochloride is modified by using lecithin, which is an anionic surfactant, and the L-lysine monohydrochloride is homogeneously dispersed so as not to be localized in the molten hardened oil. It is considered that even when basic amino acids are present at the surface of the produced granules, since the surface has been modified with lecithin, the basic amino acids are relatively stable and have a resistance to degradation in rumen juice even upon a contact with the rumen juice.

The presence of water in the feed additive composition for ruminants of the present invention influences the storage stability of the product, and consequently, it greatly affects the resistance to degradation in rumen juice. If the storage environment is at a low temperature of 10° C. or lower, the feed additive composition for ruminants is relatively stable irrespective of the content of water contained therein. However, in the case where the composition is exposed to a severe environment in which the temperature of the storage environment exceeds 40° C., if the moisture content in the feed additive composition for ruminants is decreased, the resistance to rumen juice of the basic amino acids tends to decrease. Also, if the moisture content exceeds 6% by weight, the tendency of the decrease of resistance to rumen juice is recognized. Therefore, it is desirable for the feed additive composition for ruminants of the present invention to contain moisture in a proportion of 0.01 to 6% by weight, preferably 2 to 6% by weight, more preferably 2.5 to 6% by weight, and particularly preferably 3 to 6% by weight.

The granules of the feed additive composition for ruminants of the present invention are characterized by having the above-mentioned moisture content, and at the same time, maintaining certain water repellency. The water repellency of the granules as stated in the present invention means the difficulty of moisture to infiltrate into the granule surface layer part, which property is obtained by immersing the granules in an aqueous solution having an appropriate water-soluble colorant such as red food colorant (Food Colorant No. 102) dissolved therein, for a certain time period, and the difference in the chromaticity ($\Delta t$) at the surface of granules of before and after the immersion is expressed for descriptive purposes. A low value of $\Delta t$ means that the granules are poorly stained with colorants, that is, the granules have a characteristic that the surface layer part of the granules is hardly infiltrated by moisture, while a high value of $\Delta t$ means that the granules are readily stained with colorants, that is, the granules have a characteristic that the surface layer part of the granules is susceptible to the infiltration of moisture. It is believed that when moisture infiltrates into the surface layer part of the granules, the basic amino acid contained in the granule surface layer part is eluted to the outside of the granules, and the rumen bypass property is decreased; therefore, it is preferable that the granules of the feed additive composition for ruminants have water repellency to a certain degree. As will be shown in the Test Examples that will be described later, the water repellency of the granules of the present invention is in generally 5 to 6, when expressed as the difference in redness ($\Delta t$) which is obtained by immersing the granules in a 75% aqueous solution of ethanol containing 0.1% of Food Colorant No. 102, at 40° C. for 45 minutes. The water repellency of the granules of the present invention is such that the $\Delta t$ value measured under the above-described conditions can be increased to about 3, by implementing a heating treatment on the mixture obtained by immersing a molten mixture into water to solidify. As discussed above, the feed additive composition for ruminants of the present invention can be described as a feed additive composition for ruminants containing at least one protective agent selected from a hardened vegetable oil and a hardened animal oil having a melting point higher than 50° C. and lower than 90° C., 0.05 to 6% by weight of lecithin, water, and 40% by weight or more and less than 65% by weight of a basic amino acid, wherein the difference in redness (Δt) obtained by immersing granules into a 75% aqueous solution of ethanol containing 0.1% of food colorant No. 102 at 40° C. for 45 minutes, is 3 to 6.

The feed additive composition for ruminants of the present invention is produced by a method including a process of preparing a molten mixture formed from at least one protective agent selected from a hardened vegetable oil and a hardened animal oil having a melting point higher than 50° C. and lower than 90° C., lecithin and a basic amino acid; and a process of obtaining a solidified mixture by immersing the molten mixture into water. In the aforementioned method, a protective agent, lecithin and a basic amino acid are used as raw materials, and these are melted and mixed. When this molten mixture is immersed into water to be formed into a granular shape, a portion of the basic amino acid is eluted in water, but the amount is very small. Meanwhile, water is incorporated into the mixture at this stage. This water can be reduced by a subsequent drying process. Of course, the cooling may be accomplished by immersing the molten mixture into an aqueous liquid which contains other components in addition to water.

In the process of preparing a molten mixture in the continuous production method of the present invention, a commercially available extruder can be used, but it is preferable to remove the die plate which is placed at the outlet. By removing the die plate, a molten mixture of the raw material composition for the feed additive composition for ruminants can be obtained in a state where the inside of the cylinder tube of the extruder is not subjected to so much pressure. A molten mixture containing a large amount of L-lysine monohydrochloride is difficult to be granulated by air prilling, but when even such a molten mixture is allowed to fall free directly from orifices having an appropriate diameter, the mixed molten product having a continuous rod shape is formed into a fine fiber form, and finally cut under the action of the surface tension during the falling, to become separate and individual liquid droplets. When the liquid droplets are dropped into water which is in the state of being stirred, the liquid droplets are instantaneously cooled and solidified in the water. It is the production capacity of the extruder which affects the amount of production of the composition for feed, and in the production method of the present invention, it is possible to operate the extruder at its upper limit of capacity. Here, the machine which is usable is not limited to extruder, as long as it is capable of obtaining a molten mixture of the raw material composition, and is capable of preparing a molten mixture which is turned into liquid droplets during falling.

The multi-hole shooter is a means necessary for increasing the amount of production in the method of producing the feed additive composition for ruminants of the present invention. The multi-hole shooter according to the present invention is a vessel having a perforated bottom with a plurality of holes, and is a facility for temporarily retaining a heated molten mixture discharged from the extruder. The multi-hole shooter preferably includes a heating facility so that the retained heated molten mixture does not become cold. The amount of production of the feed additive composition for ruminants is directly proportional to the number of holes provided at the bottom of the vessel. The distance from the bottom surface of the multi-hole shooter to the water surface (fall distance) determines the final shape of the granules. When the heated molten mixture is allowed to fall at a temperature of 65° C., granules having a spherical shape to a shape close to that of a rugby ball are obtained at a fall distance of 5 cm to 15 cm. Furthermore, when the fall distance is further increased, the impact energy at the water surface is increased, and thus more flattened granules having a shape of pressed barley are obtained. At a fall distance of about 50 cm, granules having a shape of pressed barley with an undulating fringe are obtained. The diameter of the holes of the multi-hole shooter is selected depending on the viscosity and the size of the granules to be produced. In the case of producing small granules, it is preferable to have holes having a size of 0.5 to 3 mm, and in order to obtain granules having a size with a diameter of about 10 mm, it is preferable to have holes having a size of about several millimeters. Typically, a size of 0.5 to 5 mm is preferred.

The processes of the production method of the present invention will be described. The basic amino acids which are used as the raw material may be pulverized and used. Pulverization is performed using, for example, a pulverizer, until the average of the particle size of the basic amino acid becomes 100 μm or less, and preferably 75 μm, and if necessary, sieving is performed. The order of addition of lecithin is not to be particularly fixed, and in order to coat the surface of the basic amino acid, for example, L-lysine monohydrochloride, with lecithin, the two substances may be mixed in advance with a Nauta mixer, and if the production efficiency is to be improved, three components of the protective agent, lecithin and basic amino acid may be nearly simultaneously charged into the cylinder of an extruder. It is also possible to respectively charge predetermined amounts of the three components through a feed inlet near the inlet of the cylinder. Alternatively, a molten mixture may be obtained by first charging a basic amino acid and hardened oil and mixing them at near room temperature, then finally charging lecithin, and heating the raw material composition to melt. The temperature for melting and mixing the raw material composition may be at or above the melting point of the hardened oil, but for example, in the case of fully hydrogenated soybean oil, since the melting point is 67 to 71° C., the melting point may be 80 to 85° C., and a temperature higher than the melting point by 5 to 15° C. is sufficient. In regard to the heating temperature, it is not necessary to heat at a temperature above the melting point from the beginning, and if the raw materials are initially pre-heated to a temperature lower than the melting point by 5 to 10° C., conveyed by the screw in the cylinder of the extruder, and then heated to a predetermined temperature above the melting point, a stable molten mixture can be obtained efficiently. The discharged heated molten mixture is temporarily retained in a multi-hole shooter, and the molten mixture is allowed to fall free into water from the holes having a size of 1 to 4 mm provided at the bottom. The temperature of water into which the falling objects are immersed may be about 10 to 30° C. The molten mixture dropped from the multi-hole shooter falls into the water which is stirred in a water tank for granule cooling, and is instantaneously solidified there. Water is constantly replenished while the water temperature is maintained constant, and at the same time, the solidified mixture is discharged from the water tank for granule cooling by being carried away by overflowing water. The solidified mixture has a specific gravity of about 1.1, and drifts in the water. The granules of the solidified mixture discharged from the water tank are collected with a net or a netted vessel, and dried to yield a feed additive composition for ruminants.

The method of producing a feed additive composition for ruminants of the present invention preferably includes a process of implementing a heating treatment on the mixture which has been solidified in water. The heating treatment may be carried out under some conditions approximately resulting in the melting of a portion of the crystalline component of the protective agent present at the surface layer part of the solidified mixture. Specifically, the solidified mixture may be exposed to an atmosphere set to a temperature near the melting point of the protective agent contained in the solidified mixture, for example, to hot water, vapor, hot air or the like, generally for some ten seconds to several tens of seconds. The amount of heat supplied to the mixture varies with the amount of the mixture (weight), and such amount of heat is determined by the product of the treatment temperature and the treatment time. Therefore, the amount of heat sufficient for a portion of the crystalline component of the protective agent present at the surface layer part of the solidified mixture to melt may be provided by exposing the solidified mixture to an atmosphere set to a temperature lower than the melting point of the protective agent contained in the solidified mixture for a longer period of time, or by exposing the solidified mixture to an atmosphere set to a temperature higher than the melting point of the protective agent contained in the solidified mixture for a shorter period of time. Specific treatment temperature and treatment time may be appropriately set based on the type of the protective agent contained in the composition and the amount of the mixture.

In another embodiment, present invention provides novel processes for raising a ruminant by feeding the ruminant such a feed additive composition. Such ruminants include cattle, goats, sheep, giraffes, American Bison, European Bison, yaks, water buffalo, deer, camels, alpacas, llamas, wildebeest, antelope, pronghorn, and nilgai. These ruminants may be fed the feed additive composition of the present invention at any time and in any amount during their life. That is, the ruminant may be fed the feed additive composition of the present invention either by itself or as part of a diet which includes other feedstuffs. Moreover, the ruminant may be fed the feed additive composition of the present invention at any time during their lifetime. The ruminant may be fed the feed additive composition of the present invention continuously, at regular intervals, or intermittently. The ruminant may be fed the feed additive composition of the present invention in an amount such that it accounts for all, a majority, or a minority of the feed in the ruminant's diet for any portion of time in the animal's life. Preferably, the ruminant is fed the feed additive composition of the present invention in an amount such that it accounts for a majority of the feed in the animal's diet for a significant portion of the animal's lifetime.

In another embodiment, the present invention provides novel processes for making meat by harvesting meat from a ruminant which have been fed such a feed additive composition. The ruminants in this embodiment are the same as those described above in connection with the present process for raising ruminants. The feeding may be carried out as described above in connection with the process for raising ruminants. The meat may be harvesting at any suitable time during the animal's lifetime. The harvesting of the meat may be carried out using the techniques conventional in the art of butchering. Typical meats to be harvested include, beef, pork, mutton, lamb, venison, bison, etc. The meat may be sold fresh or frozen. The meat may be processed as described in Kirk-Othmer, *Encyclopedia of Chemical Technology*, Fourth Ed., Wiley-Interscience, NY, vol. 16, pp. 68-87, 1995, which is incorporated herein by reference.

In another embodiment, the present invention provides novel processes for making milk by harvesting milk from a ruminant which have been fed such a feed additive composition. The ruminants in this embodiment are those which produce milk, such as cattle, oxen, bison, deer, goats, sheep, etc. The feeding may be carried out as described above in connection with the process for raising ruminants. The harvesting of the milk may be carried out using the conventional techniques known to those in the art. The milk may be processed, stored, cooled, shipped, and packaged, as described in Kirk-Othmer, *Encyclopedia of Chemical Technology*, Fourth Ed., Wiley-Interscience, NY, vol. 16, pp. 700-746, 1995, which is incorporated herein by reference.

In another embodiment, the present invention provides processes for making a dairy product from the milk harvested from a ruminant which has been fed the feed additive composition of the present invention. Such dairy products include evaporated and condensed milk, dry milk, cream, anhydrous milk fat, butter, buttermilk, cheese, yogurt, and frozen desserts (such as ice cream, frozen yogurt, ice milk, sherbets, and mellorine), lactose, and casein. The conversion of the milk into the dairy product may be carried out using conventional techniques known to those skilled in the art as described in Kirk-Othmer, *Encyclopedia of Chemical Technology*, Fourth Ed., Wiley-Interscience, NY, vol. 16, pp. 700-746, 1995, which is incorporated herein by reference.

In another embodiment, the present invention provides novel processes for making wool by harvesting wool from a ruminant been fed such a feed additive composition. The ruminants in this embodiment are those which produce wool, such as goats, sheep, lambs, lama, alpaca, etc. The feeding may be carried out as described above in connection with the process for raising ruminants. The wool may be harvested and treated by conventional techniques known to those skill in the art and as described in Kirk-Othmer, *Encyclopedia of Chemical Technology*, Fourth Ed., Wiley-Interscience, NY, vol. 25, pp. 664-712, 1998, which is incorporated herein by reference.

In another embodiment, the present invention provides novel processes for making leather by harvesting skin from a ruminant which have been fed such a feed additive composition and converting the skin into leather. In the context of the present invention, the term leather also includes suede and the term skin include hides and pelts. The ruminants in this embodiment are those whose skin may be converted into leather, such as cattle, oxen, bison, deer, goats, sheep, lambs, lama, alpaca, yaks, etc. The feeding may be carried out as described above in connection with the process for raising ruminants. The skin may be harvested and converted into leather by conventional techniques known to those skill in the art and as described in Kirk-Othmer, *Encyclopedia of Chemical Technology*, Fourth Ed., Wiley-Interscience, NY, vol. 15, pp. 159-177, 1995, which is incorporated herein by reference.

Other features of the invention will become apparent in the course of the following descriptions of exemplary embodiments which are given for illustration of the invention and are not intended to be limiting thereof.

EXAMPLES

Hereinafter, evaluation methods will be described.
Method for Measuring Viscosity.
A molten mixture in a slurry form obtained by heating (85° C.) and melting the mixture using an extruder was weighed to 100 g in a 200-ml beaker made of heat resistant glass, placed in a constant temperature water bath at 90° C., and slowly stirred to set the temperature of the molten mixture at 90° C. When the temperature became constant at 90° C., viscosity measurement was performed at 90° C. using a rotational viscometer of Viscometer Model BL manufactured by Tokimec, Inc. For the measurement, a rotating shaft for direct viscosity measurement was immersed into the molten mixture in the beaker, the rotating shaft was rotated, and the viscosity was measured several times. When the value became constant, it was determined as the rotational viscosity (Pa·s) at 90° C.

Moisture Content in Preparation.

The moisture content was determined by measuring the weight loss after heating at 105° C. for 20 minutes, using a Kett moisture analyzer (Infrared Moisture Balance FD-610).

Content of L-Lysine Monohydrochloride in Preparation (Dried Product): "w".

In a 50-ml conical tube manufactured by Falcon, Corp., 4.00 g of the dried product obtained after the measurement of moisture content in the preparation, and 20.0 g of pure water were weighed and tightly stoppered. The conical tube was immersed in a constant temperature water bath at 85° C. for 20 minutes, to melt the hardened soybean oil. The hardened oil and L-lysine monohydrochloride were separated, and L-lysine monohydrochloride was dissolved in an aqueous solution. The L-lysine monohydrochloride thus recovered was analyzed by conventional liquid chromatography, and thus the content (% by weight) of L-lysine monohydrochloride in the preparation (dried product), "w," as determined.

Content of L-Lysine Monohydrochloride in Preparation: "W".

In a 50-ml conical tube manufactured by Falcon, Corp., 4.00 g of the preparation and 20.0 g of pure water were weighed and tightly stoppered. The conical tube was immersed in a constant temperature water bath at 85° C. for 20 minutes, to melt the hardened soybean oil. The hardened oil and L-lysine monohydrochloride were separated, and L-lysine monohydrochloride was dissolved in an aqueous solution. The L-lysine monohydrochloride thus recovered was analyzed by conventional liquid chromatography, and thus the content (% by weight) of L-lysine monohydrochloride in the preparation, "W," was determined.

Protection Rate: "A".

2.00 g of the preparation was weighed in a 50-ml conical tube manufactured by Falcon, Corp., and 10.0 g of an artificial rumen juice was added thereto. The conical tube was tightly stoppered and laid horizontal, and the tube was shaken for 20 hours in an oscillating shaker at 40° C. Subsequently, the content of L-lysine monohydrochloride in the aqueous solution was analyzed before and after the shaking, and the proportion (%) of L-lysine monohydrochloride in the preparation which was not eluted out at 40° C. for 20 hours, was determined as the protection rate (%): "A."

Small Intestine Arrival Rate: "W"×"A".

The product of the content of L-lysine monohydrochloride in the preparation "W" (% by weight) and the protection rate "A" (%) was determined as the small intestine arrival rate ("W"×"A").

Example 1

Since the amount of soybean lecithin used was a trace amount, in order to uniformly disperse this, soybean lecithin was triturated in advance by a mixing granulator using finely pulverized L-lysine monohydrochloride (the composition ratio was L-lysine monohydrochloride:soybean lecithin=5:1). Three components, that is, finely pulverized L-lysine monohydrochloride for feed having an average particle size of 75 μm (manufactured by Ajinomoto Co., Inc.), soybean lecithin (manufactured by Ajinomoto Co, Inc.) and fully hydrogenated soybean oil (melting point 67° C.; manufactured by Yokozeki Oil & Fat Corp.) were respectively weighed at the composition shown in Table 1, including the above-mentioned amount of soybean lecithin, and so as to obtain a total amount of 5 kg, and the three components were sufficiently mixed. In addition, as the amino acid for invention 10, a mixture formed by adding 6.0% by weight of DL-methionine (manufactured by Ajinomoto Co., Inc.) to 42% by weight of L-lysine monohydrochloride was prepared. Subsequently, the composition raw materials were charged into the hopper of a twin-screw extruder for laboratory use (Laboruder Model Name: Mark-II, manufactured by Japan Steel Works, Ltd.), and the composition raw materials were continuously fed at 9 kg/h from the hopper into the feed inlet of the screw which had been preliminarily heated (preliminary heating temperature 60° C., main heating temperature 85° C., set temperature at outlet 70° C.) and was rotating (400 rpm). The molten mixture was conveyed into the screw to be heated, melted and mixed, and was discharged from the outlet of the extruder with its die plate removed, in the form of finely textured, uniform molten slurry. The discharged molten mixture in a slurry state was charged into a multi-hole shooter (number of holes: 30, size of hole: 2 mm in diameter), which was set directly underneath. The molten mixture in a slurry state was temporarily retained in the multi-hole shooter, and was dispersed through the thirty holes. The molten mixture in a slurry state was discharged from a plurality of holes at a low speed such that the discharge rate from one hole was 0.3 kg/h, and formed perfect liquid droplets. The liquid droplets fell into a water tank for granule cooling (20° C.), which was placed directly below and was being stirred, and were cooled to instantaneously solidify. At this time, the distance from the bottom surface of the multi-hole shooter to the water surface of the water tank for granule cooling was 20 cm. The shape of the granules of the solidified mixture obtained in this manner were such that those having a high rotational viscosity obtained a shape of flatly deformed rugby ball having a diameter of 3 to 4 mm, and those having a low rotational viscosity obtained a shape of pressed barley having a diameter of 5 to 8 mm. The obtained granules of the solidified mixture were recovered, the water of adhesion was dehydrated, and then the granules were dried in air at ambient temperature to obtain the feed additive composition for ruminants of the present invention (subject inventions 1 to 10). The loss of raw materials in the composition due to water and others was small, and the recovery rate was as high as 98 to 99.5% in all cases. The content of L-lysine monohydrochloride W in the obtained granules×protection rate for lysine [A] in the rumen juice, represented the small intestine arrival rate of L-lysine monohydrochloride, W×[A], and this value was 35% by weight or more as shown in Table 1. The specific weight of the obtained feed additive composition for ruminants was 1.05 to 1.15, and the composition drifted in the rumen juice without floating thereon.

TABLE 1

| | | Composition of feed additive composition | | | Rotational viscosity of slurry (Pa·s) | Moisture content in feed additive composition (wt %) | Content of lysine hydrochloride in feed additive composition (dried product) (w) (wt %) | Content of lysine hydrochloride in feed additive composition (W) (wt %) | Evaluation of rumen juice infiltration | |
|---|---|---|---|---|---|---|---|---|---|---|
| | | L-lysine hydrochloride (wt %) | Soybean lecithin (wt %) | Fully hydrogenated soybean oil (wt %) | | | | | Protection rate [A] (%) | Small intestine arrival rate W · [A] |
| Present Invention | 1 | 40.0 | 0.5 | 59.5 | 1.8 | 1.5 | 39.9 | 39.3 | 91.4 | 35.9 |
| | 2 | 40.0 | 1.0 | 59.0 | 1.2 | 1.8 | 40.0 | 39.3 | 90.3 | 35.5 |
| | 3 | 40.0 | 2.0 | 58.0 | 0.44 | 2.0 | 39.8 | 39.0 | 90.3 | 35.2 |
| | 4 | 45.0 | 2.0 | 53.0 | 0.82 | 2.2 | 44.5 | 43.5 | 84.3 | 36.7 |
| | 5 | 50.0 | 2.0 | 48.0 | 1.2 | 2.5 | 49.8 | 48.6 | 76.7 | 37.2 |
| | 6 | 55.0 | 0.5 | 44.5 | 2.2 | 3.1 | 54.1 | 52.4 | 69.5 | 36.4 |
| | 7 | 55.0 | 1.0 | 44.0 | 2.0 | 3.5 | 54.2 | 52.3 | 71.3 | 37.3 |
| | 8 | 55.0 | 2.0 | 43.0 | 1.7 | 4.1 | 54.5 | 52.3 | 69.7 | 36.4 |
| | 9 | 60.0 | 0.5 | 39.5 | 4.3 | 4.5 | 59.5 | 56.8 | 69.2 | 39.3 |
| | 10 | 42.0 | 2.0 | 50.0 | 4.1 | 1.1 | 40.5 | 40.0 | 87.5 | 35.0 |
| | | | | | | | (6.0) | (5.9) | (90.3) | (5.3) |
| Comparative Example | 1 | 30.0 | 2.0 | 68.0 | 0.15 | 1.1 | 29.9 | 29.6 | 94.2 | 27.9 |
| | 2 | 65.0 | 2.0 | 33.0 | 5.7 | — | 62.4 | — | — | — |
| | 3 | 65.0 | 4.6 | 30.4 | 5.2 | — | 60.0 | — | — | — |
| | 4 | 40.0 | 2.0 | 58.0 | 0.44 | 0.3 | 40.0 | 39.9 | 45.5 | 18.1 |
| | 5 | 45.0 | 2.0 | 53.0 | 0.82 | 0.4 | 44.8 | 44.6 | 37.5 | 16.7 |
| | 6 | 50.0 | 2.0 | 48.0 | 1.2 | 0.3 | — | — | — | — |
| | 7 | 40.0 | — | 30.0 | 1.3 | 1.1 | 39.1 | 38.7 | 42.8 | 16.6 |

The numerical values in ( ) are the values for DL-methionine.

Comparative Example 1

An experiment was performed by the same method as in Example 1 and with the composition and the blending amounts shown in Table 1, with L-lysine monohydrochloride 1in an amount decreased to 30% by weight, and the obtained results are presented together in Table 1. The rotational viscosity obtained when the composition was heated and melted was 0.15 Pa·s, and the liquidity was quite fluid. The protection rate [A] of the Comparative Example 1 was high, but the small intestine arrival rate of L-lysine monohydrochloride was low.

Comparative Examples 2 and 3

The results obtained by the same method as in Example 1, with a larger amount of L-lysine monohydrochloride are presented together in Table 1. In Comparative Examples 2 and 3, the mixtures heated and melted in the extruder were in the form of slurry, but since the rotational viscosity was very high, the heated and melted mixture did not form liquid droplets even when dropped from the multi-hole shooter, and formulation into granules could not be achieved.

Comparative Examples 4 to 6

The slurry-like mixture which was obtained using the composition raw materials and blending ratios indicated in Table 1 by heating and melting them in an extruder in the same manner as in Examples, was heated to 90° C., and the mixture was granulated by air prilling with pressurized air (0.5 MPa), using a nozzle having an orifice diameter of 3 mm. In the case where granulation by prilling was possible, an evaluation of the resulting preparation was performed, and the results are presented in Table 1. In Comparative Examples 4 and 5, granulation by prilling was possible, but the preparations mostly did not contain moisture, and had very low protection rates [A], and therefore, small intestine arrival rates W×[A] were also low. The particles of the resulting preparations were spheres with a diameter of about 1 mm, and classification was unavoidable when blended into feedstuff. In the raw materials containing 50% by weight of L-lysine monohydrochloride as indicated in Comparative Example 6, since the rotational viscosity of the resulting slurry-like mixture was high, prilling of the slurry-like mixture in the air by means of pressurized air (0.5 MPa) could not be carried out, and it was not possible to obtain a granulated preparation.

Comparative Example 7

As an example of the composition formed from an amino acid, high melting point oil and fat, and low melting point oil and fat as disclosed in Japanese Patent Application Publication (JP-B) No. 49-45224, a composition containing 40% by weight of L-lysine monohydrochloride, 30% by weight of hardened soybean oil and 30% by weight of soybean oil (not containing lecithin) was prepared, and a molten mixture was prepared by heating and melting the aforementioned composition at 85° C. using an extruder with its die plate removed, in the same manner as in Example 1. The molten mixture was charged into a multi-hole shooter, and was immersed into water at 20° C. to obtain granules. An evaluation of these granules was performed, and the results are presented together in Table 1. As a result, it was confirmed that these granules had a low protection rate [A], and a small intestine arrival rate, W×[A], lower than those of the Examples. In particular, the small intestine arrival rate which indicates the amount of L-lysine monohydrochloride arriving at the small intestine of a lactating cow was as low as 16.7%, and this implies that there is a large loss along the way, and the preparation cannot be provided for practical use. The specific weight of the preparation was less than 1, and the preparation floated on the surface in the rumen juice.

Example 2

17.7 kg of L-lysine monohydrochloride for feedstuff (manufactured by Ajinomoto Co., Inc.) which was pulverized to a particle size of 100 μm or less was charged into a Nauta Mixer NX-S (manufactured by Hosokawa Micron, Ltd.), and 3.5 kg of soybean lecithin (manufactured by Ajinomoto Co., Inc.) was added and mixed therewith while being stirred. 1.3 kg of the mixture, 9.9 kg of the above-mentioned L-lysine monohydrochloride, and 8.8 kg of fully hydrogenated soybean oil (manufactured by Yokozeki Oil & Fat Corp.; melting point 67° C.) were mixed with the Nauta Mixer. Subsequently, the mixture was charged into a twin-screw extruder (manufactured by Cosmotec Corp.) having the inside of the screw heated to 85° C., and the slurry-like molten mixture discharged from the outlet was charged into a multi-hole shooter (number of holes: 30, size of hole: 2 mm in diameter). The slurry-like molten mixture was dropped into a stirred water tank which was installed at a distance of 20 cm from those holes to cool and solidify the molten mixture, and the resulting granules of the solidified mixture were recovered. The recovered granules were subjected to the dehydration of the water of adhesion, and were dried in air at ambient temperature. In that regard, various granules having a moisture content of 0.01% to 6.1% were produced by varying the time for air drying from 0 to 14 hours. The granules thus produced were subjected to the measurement of the content of L-lysine monohydrochloride W, and then a part of them was placed in a chamber at 45° C., while the remnants were stored at 4° C. After three days, the granules were taken out, and the protection rate [A] was measured. The results are presented in Table 2 and FIG. 1. The protection rate [A] of the granules stored at 4° C. was not much affected in the moisture content and was in the range of about 60% to 70%, while the protection rate [A] of the granules stored at 45° C. decreased in the case where the moisture content was smaller than 2% by weight and in the case where the moisture content exceeded 6% by weight.

TABLE 2

| Moisture content in feed additive composition (wt %) | Content of L-lysine mono- hydrochloride in feed additive composition (W) (wt %) | Protection rate [A] % | | Rate of change (A1 − A2) · 100/A1 % |
|---|---|---|---|---|
| | | Stored at 4° C. A1 % | Stored at 45° C. A2 % | |
| 1.4 | 49.5 | 67.6 | 39.9 | 41 |
| 1.9 | 52.2 | 68.6 | 51.0 | 25.7 |
| 2.5 | 51.6 | 69.5 | 61.6 | 11.4 |
| 3.1 | 51.9 | 68.0 | 62.4 | 8.2 |
| 3.8 | 51.6 | 68.4 | 66.9 | 2.2 |
| 4.2 | 51.6 | 68.0 | 66.9 | 1.6 |
| 4.6 | 50.9 | 65.1 | 67.0 | −2.9 |
| 5.3 | 51.4 | 64.4 | 67.1 | −4.2 |
| 5.6 | 50.9 | 65.2 | 67.1 | −2.9 |
| 6.1 | 49.9 | 59.6 | 54.5 | 8.4 |

Example 3

1) Composition raw materials which had been mixed in advance to a weight ratio of 54.9% of L-lysine monohydrochloride (manufactured by Ajinomoto Co., Inc.), 1.1% of soybean lecithin (manufactured by Ajinomoto Co., Inc.) and 44% of fully hydrogenated soybean oil (melting point 67° C.; manufactured by Yokozeki Oil & Fat Corp.) were charged into the hopper of a twin-screw extruder for laboratory use (Laboruder Model Name: Mark-II, manufactured by Japan Steel Works, Ltd.), and the composition raw materials were continuously fed at 9 kg/h from the hopper into the feed inlet of the rotating (400 rpm) screw which had been preliminarily heated (preliminary heating temperature 60° C., main heating temperature 85° C., set temperature for outlet 70° C.). The molten mixture was conveyed into the screw to be heated, melted and mixed, and was discharged from the outlet of the extruder with its die plate removed, in the form of finely textured, uniform molten slurry. The discharged molten mixture in a slurry state was charged into a multi-hole shooter (number of holes: 30, size of hole: 2 mm in diameter), which was set directly underneath. The molten mixture in a slurry state was temporarily stored in the multi-hole shooter, and was dispersed through the thirty holes. The molten mixture in a slurry state was discharged from a plurality of holes of the multi-hole shooter, and formed perfect liquid droplets. The liquid droplets fell into a water tank for granule cooling (10° C.), which was placed directly below and was being stirred, and were cooled to instantaneously solidify. At this time, the distance from the bottom surface of the multi-hole shooter to the water surface of the water tank for granule cooling was 10 cm. The granules of the solidified mixture obtained in this manner were left to stand in the water for 30 minutes, then the water of adhesion at the surface was dehydrated, and thus a feed additive composition for ruminants was recovered. Subsequently, 200 g of the feed additive composition for ruminants was placed in a fluidized bed drying machine (FLOmini, manufactured by Okawara Manufacturing Co., Ltd.) set at a temperature of 40° C. for 5 minutes, in a fluidized bed drying machine (FLOmini, manufactured by Okawara Manufacturing Co., Ltd.) set at a temperature of 50° C. for 5 minutes, and in a fluidized bed drying machine (FLOmini, manufactured by Okawara Manufacturing Co., Ltd.) set at a temperature of 60° C. for 3 minutes, to be subjected to a heating treatment. The results of measuring the moisture content and protection rate of the feed additive composition for ruminants obtained before and after the heating treatment are presented in Table 3.

TABLE 3

| Heating treatment temperature (° C.) | Heating treatment time (min) | Moisture content (wt %) | Protection rate [A] % |
|---|---|---|---|
| Untreated | Not treated | 6.2 | 73 |
| 40° C. | 5 minutes | 4.4 | 85 |
| 50° C. | 5 minutes | 4.7 | 84 |
| 60° C. | 3 minutes | 4.8 | 80 |

2) Composition raw materials which had been mixed in advance to a weight ratio of 54.9% of L-lysine monohydrochloride (manufactured by Ajinomoto Co., Inc.), 1.1% of soybean lecithin (manufactured by Ajinomoto Co., Inc.) and 44% of fully hydrogenated soybean oil (melting point 67° C.; manufactured by Yokozeki Oil & Fat Corp.) were charged into the hopper of a twin-screw extruder for laboratory use (Laboruder Model Name: Mark-II, manufactured by Japan Steel Works, Ltd.), and the composition raw materials were continuously fed at 20 kg/h from the hopper into the feed inlet of the rotating (130 rpm) screw which had been preliminarily heated (preliminary heating temperature 65° C., main heating temperature 85° C., set temperature for outlet 70° C.). The molten mixture was conveyed into the screw to be heated, melted and mixed, and was discharged from the outlet of the extruder with its die plate removed, in the form of finely textured, uniform molten slurry. The discharged molten mixture in a slurry state was charged into a multi-hole shooter (number of holes: 30, size of hole: 2 mm in diameter), which was set directly underneath. The molten mixture in a slurry state was temporarily retained in the multi-hole shooter, and was dispersed through the thirty holes. The molten mixture in a slurry state was discharged from a plurality of holes of the multi-hole shooter, and formed perfect liquid droplets. The liquid droplets fell into a water tank for granule cooling (10° C.), which was placed directly below and was being stirred, and were cooled to instantaneously solidify. At this time, the distance from the bottom surface of the multi-hole shooter to the water surface of the water tank for granule cooling was 10 cm. The granules of the solidified mixture obtained in this manner were left to stand in the water for 40 minutes, then the water of adhesion at the surface was dehydrated, and thus a feed additive composition for ruminants was obtained. Subsequently, 200 g of the feed additive composition for ruminants was placed in a fluidized bed drying machine (FLO-mini, manufactured by Okawara Manufacturing Co., Ltd.) set at a temperature of 50° C. for 15 minutes, to be subjected to a heating treatment. The feed additive composition for ruminants which had not been subjected to the heating treatment, and the same composition which had been subjected to the heating treatment were respectively stored at 25° C. and 40° C. for one month, and then the protection rates were measured. These results are presented in Table 4.

TABLE 4

| | Protection rate [A] % | | |
|---|---|---|---|
| | Before storing | Stored at 25° C. for 1 months | Stored at 40° C. for 1 months |
| Without heating treatment | 81 | 79 | 74 |
| Heated at 50° C. for 5 minutes | 85 | 85 | 83 |

Example 4

In regard to the feed additive composition for ruminants without heating treatment as shown in Table 4 of Example 3; the feed additive composition for ruminants heated at 50° C. for 5 minutes in the same table; white granules recovered after sieving "Bypass Supply Milkan (registered trademark) Plus Lysine" which is commercially available from Bio Science Co., Ltd. (the product is listed in the website of the same company: http://www.bioscience.cojp/proudct/chi_05.html, Japanese Patent Registration No. 3728738); and the composition of Comparative Example 7, the water repellencies of the respective compositions were measured. 20 mL of a 75% water-containing ethanol solution in which 0.1% by weight of Food Colorant No. 102 was dissolved was provided in a glass sample bottle, and after heating this to 40° C., 1.2 g of each of the compositions was added to the sample bottle to be immersed at 45° C. for 40 minutes. After recovering each of the compositions, the solution at the surfaces was lightly wiped out, and then the degree of redness was measured with a color difference meter (Konica Minolta Holdings, Inc.). The measurement results of n=5 (average) are presented in Table 5.

TABLE 5

| | Without heating treatment | With heating treatment | White granules | Comparative Example 7 |
|---|---|---|---|---|
| Before staining | 2.20 | 1.85 | 1.39 | 0.45 |
| After staining | 7.36 | 5.00 | 12.16 | 8.56 |
| Δt value | 5.16 | 3.15 | 10.77 | 8.11 |

Additionally, in regard to the Comparative Example 7, a reduction in the composition weight was observed when comparing before staining and after staining, and elution of L-lysine monohydrochloride and the protective agent from the composition had occurred. From the above-described results, it was confirmed that the feed additive composition for ruminants of the present invention had a high water repellency at 40° C., and the rumen bypass property of the feed additive composition for ruminants was superior to that of the white granules and Comparative Example 7. Furthermore, the water repellency of the feed additive composition for ruminants of the present invention could be further enhanced by a heating treatment, so that the rumen bypass property could be improved.

Test Example

According to the method described in Example 1, 100 g of three components including finely pulverized L-lysine monohydrochloride for feed (manufactured by Ajinomoto Co., Inc.) having an average particle size of 75 μm, soybean lecithin (manufactured by Ajinomoto Co., Inc.), and fully hydrogenated soybean oil (melting point 67° C.; manufactured by Yokozeki Oil & Fat Corp.) was weighed in a beaker at the ratio of percentage by weight shown in Table 6, and the mixture was heated to 80° C. while sufficiently mixing to obtain a molten slurry of L-lysine monohydrochloride. Then, under the conditions described in Example 1, dispersion of the molten slurry by means of a multi-hole shooter, conversion into liquid droplets, and solidification by cooling in water were carried out to prepare feed additive compositions for ruminants 1 to 7 and a comparison composition 8. In addition, since the heated molten product of the comparison composition 8 was highly viscous so that liquid droplets from the multi-hole shooter were not formed, a granulated composition was prepared by collecting the heated molten product in small amounts with a microspatula and immediately immersing them into water to solidify.

2.00 g of each of the compositions was weighed in a 50-ml conical tube manufactured by Falcon, Inc., and 10.0 g of an artificial rumen juice was added thereto. The tube was tightly stoppered and laid horizontally, and the tube was shaken in an oscillating shaker at 40° C. for 20 hours. The contents of L-lysine monohydrochloride in the aqueous solution before and after the shaking were analyzed, and thus the elution rate of L-lysine monohydrochloride per unit time was calculated. The results are presented in Table 6 and FIG. 2.

TABLE 6

| Test No. | Raw material composition (wt %) | | | Elution rate of lysine %/h | Ratio of elution rate of lysine |
|---|---|---|---|---|---|
| | Lecithin | L-Lysine monohydrochloride | Fully hydrogenated soybean oil | | |
| 1 | 0.05 | 54 | 45.95 | 8.5 | 1/1.5 |
| 2 | 0.1 | 54 | 45.9 | 4.1 | 1/3.2 |
| 3 | 1 | 54 | 45 | 2.2 | 1/6.0 |
| 4 | 2 | 54 | 44 | 2.3 | 1/5.7 |
| 5 | 4 | 54 | 42 | 5.9 | 1/2.2 |
| 6 | 5 | 54 | 41 | 11.9 | 1/1.1 |
| 7 | 6 | 54 | 40 | 30.1 | 2.3 |
| 8 | 0 | 54 | 46 | 13.1 | 1 |

Figure 2:
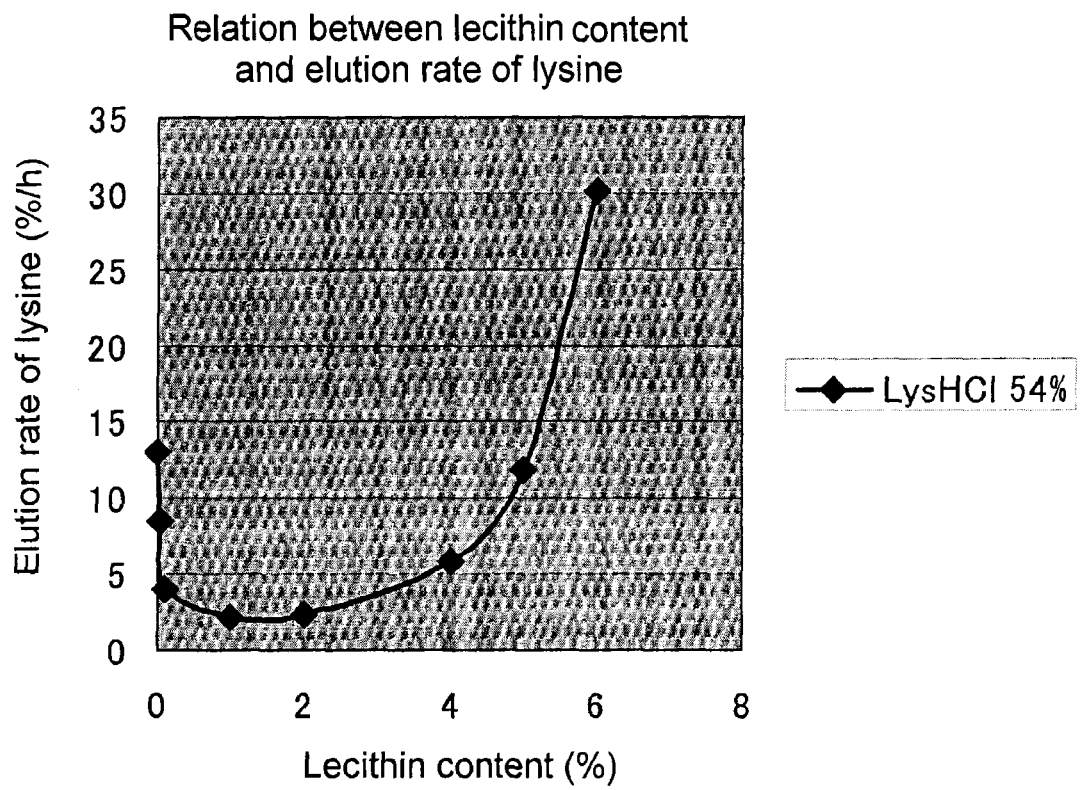
FIG. 2 is a graph showing the relationship between the lecithin content in the feed composition and the elution rate of L-lysine monohydrochloride from the feed.

As shown in Table 6 and FIG. 2, it was confirmed that elution of L-lysine monohydrochloride from the composition in the rumen juice can be suppressed by the addition of lecithin. The effect of suppressing the elution of L-lysine monohydrochloride was noticeable with an additional amount of lecithin of about 5% by weight or less, and particularly 1 to 5% by weight. In addition, when lecithin is contained in the raw materials in an amount of 6% by weight or more, the elution rate of lysine can also be increased in comparison to the composition having no lecithin added.

Where a numerical limit or range is stated herein, the endpoints are included. Also, all values and subranges within a numerical limit or range are specifically included as if explicitly written out.

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. A method of producing a feed additive composition, comprising:
   (i) preparing a molten mixture comprising at least one protective agent, lecithin, and at least one basic amino acid; and
   (ii) obtaining a solidified mixture by immersing the molten mixture in water;
   wherein:
   the at least one protective agent is selected from the group consisting of a hardened vegetable oil having a melting point higher than 50° C. and lower than 90° C. and a hardened animal oil having a melting point higher than 50° C. and lower than 90° C.; and
   the feed additive composition is a dispersion type composition.

2. The method of claim 1, wherein:
   preparing the molten mixture comprises preparing a molten mixture by heating and melting using an extruder; and
   obtaining the solidified mixture comprises obtaining a solidified mixture by allowing the molten mixture retained in a multi-hole shooter having a plurality of holes at a vessel bottom to fall through the plurality of holes into the water.

3. The method of claim 2, wherein a distance from the multi-hole shooter to the water is 5 cm or more and less than 150 cm.

4. The method of claim 1, wherein the temperature of the water is 10-30° C.

5. The method of claim 1, further comprising heat treating the solidified mixture.

6. The method of claim 1, wherein:
   the at least one protective agent is present in the feed additive composition in an amount of 39.5 to 59.5% by weight;
   the lecithin is present in the feed additive composition in an amount of 0.05 to 5% by weight;
   the at least one basic amino acid is present in the feed additive composition in an amount of 40% to 60% by weight;
   the feed additive composition comprises water;
   the at least one basic amino acid comprises at least one of L-lysine and a salt of L-lysine; and
   the feed additive composition has water repellency on a surface thereof.

7. The method of claim 6, wherein water is present in the feed additive composition in an amount of 0.01 to 6% by weight.

8. The method of claim 6, wherein water is present in the feed additive composition in an amount of 2 to 6% by weight.

9. The method of claim 6, wherein a difference in redness ($\Delta t$) is 3 to 6 when granules of the feed additive composition are immersed in a 75% aqueous solution of ethanol containing 0.1% of Food Colorant No. 102, at 40° C. for 45 minutes.

10. The method of claim 6, wherein an average particle size of the at least one of L-lysine and a salt of L-lysine is 100 µm or less.

11. The method of claim 6, wherein an average particle size of the at least one of L-lysine and a salt of L-lysine is more than 50 µm and less than 75 µm.

12. The method of claim 6, wherein the at least one protective agent comprises fully hydrogenated soybean oil.

13. The method of claim 6, wherein:
   the feed additive composition comprises the salt of L-lysine; and
   the salt of L-lysine comprises L-lysine monohydrochloride.

* * * * *